United States Patent [19]

Nakagomi

[11] Patent Number: 4,570,360

[45] Date of Patent: Feb. 18, 1986

[54] HOPPER DRIER

[76] Inventor: Shoji Nakagomi, 518-1, Shirakuwa, Urawa-shi, Saitama, Japan

[21] Appl. No.: 607,366

[22] Filed: May 7, 1984

[30] Foreign Application Priority Data

May 7, 1983 [JP] Japan ............................ 58-68039[U]

[51] Int. Cl.⁴ .......................................... F26B 17/14
[52] U.S. Cl. .......................................... 34/80; 34/54; 34/169
[58] Field of Search ......................... 34/80, 77, 169, 54

[56] References Cited

U.S. PATENT DOCUMENTS 1,749,763  3/1930  Fleisher .................................. 34/80
3,621,585  11/1971 Robertson ............................... 34/80
3,737,626  6/1973  Davis et al. ........................... 219/304

Primary Examiner—Larry I. Schwartz
Attorney, Agent, or Firm—Jordan and Hamburg

[57] ABSTRACT

An improved hopper drier for drying granular material of synthetic resin to supply it to a molding machine. The hopper drier includes two dehumidifying columns which are arranged such that dry air dehumidified in one of the dehumidifying columns at a lower temperature is delivered to a heating pipe spirally wound round the heating column disposed adjacent to the hopper drier housing. After air is preheated in the heating pipe, it is mixed with waste air coming from the hopper drier housing and the mixture is then heated in the heating column. While the one dehumidifying column is operated under normal working conditions, the other dehumidifying column is supplied with a part of the dehumidified air flowing from the one dehumidifying column so as to dry dehumidifying material held in the other dehumidifying column. When it is detected that the one dehumidifying column has reduced dehumidifying capability, a shifting operation is carried out immediately so that air dehumidified in the other dehumidifying column is delivered to the heating pipe.

9 Claims, 2 Drawing Figures

HOPPER DRIER

BACKGROUND OF THE INVENTION

1. Field of the Invention

The present invention relates to a hopper for supplying raw material to a molding machine and more particularly to a hopper drier for drying granular material of synthetic resin or the like to supply it to a molding machine.

Raw material of synthetic resin used for molding products of synthetic resin such as plastic or the like is generally supplied in the form of pellets. As is well known, when pellets contain moisture more than a predetermined level, hydrolyzation takes place during molding operation, resulting in the synthetic resin being deteriorated. Thus, molded products have reduced strength and ductility. Further, as moisture in pellets increases, molten resin becomes fluid. This results in that molten resin is excessively filled in a molding die and thereby burs are formed round molded products, causing them to have an incorrect geometrical configuration, reduced accuracy and a spoilt surface appearance. For this reason there is a necessity for sufficiently drying pellets prior to using the latter. To meet this requirement it has been proposed that pellets be dried by using atmospheric air. However, it was found that this proposal was unacceptable for the reason mentioned below.

As is known, atmospheric air contains certain moisture. If it is assumed that outside air has a temperature of 20° C., an absolute pressure of 760 mm Hg and a relative humidity of 75%, the moisture contained in air has a unit volume of 1 $m^3$ amounts to 10.251 grams. If this wet air is introduced into a molding machine by operating a blower having a capacity of 2.5 $m^3$ per minute, the result is that moisture passes through pellets at a rate of 2630.25 grams per hour. In a case where nylon resin having a high moisture absorptivity is employed for a molding operation, moisture more than that removed by drying is given to the nylon pellets.

2. Description of the Prior Art

In view of these facts, a molding factory where drying is required at a high rate has hitherto been equipped with a hopper having a drier incorporated therein for drying pellets prior to delivering them to a molding machine.

To facilitate understanding of the present invention it will be helpful for a typical conventional hopper drier to be described below with reference to FIG. 1. As illustrated in the drawing, the conventional hopper drier includes a hopper housing 11 in which pellets to be supplied to a molding machine are stored, a dehumidified air preparing unit 12 for preparing dehumidified air to be delivered to the hopper housing 11 and a heating column 13 in which dehumidified air is heated up to an elevated temperature. Specifically, the dehumidified air preparing unit 12 includes two dehumidifying columns 14 and 15 with dehumidifying material filled therein, a heater 16 for drying dehumidifying material in the dehumidifying columns 14 and 15 with the aid of hot air having a temperature higher than 300° C. to regenerate it, a cooling apparatus 17 for cooling dehumidifying material which has been regenerated by hot air and three-way valves 18 for delivering only to the one dehumidifying column air coming from the heater 17 and the cooling apparatus 17 and delivering to the heating column 13 air which has passed through the other dehumidifying column. The heating column 13 is provided with a heater 19 so that dry air introduced into the heating column 13 from the dehumidifying column 14 via the three-way valve 18, the blower 20, the filter 21 and the stop valve 22 is heated up to an elevated temperature and thereafter it is delivered to the hopper drier housing 11 to dry pellets stored in the latter. After passing through the hopper drier housing 11, waste air is discharged into the outside environment via a discharging port 23. As illustrated in the drawing, a part of the waste air is introduced into dehumidifying column 14 or 15 after it is cooled down in a cooling apparatus 24 and then it flows through a filter 25.

Next, when the three-way valve 18 is shifted, the dehumidifying column 15 initiates a so-called regenerating cycle in which moisture absorbed in dehumidifying material is removed. Namely, dry air taken from the dehumidifying column 14 by operating the blower 20 is caused to flow through the stop valve 26 and the cooling apparatus 17 which is now kept inoperative and it is then heated in the heater 16. Thus heated air is delivered to the dehumidifying column 15 via the three-way valve 18 and thereby dehumidifying material with moisture absorbed therein is dried. After completion of dehumidification the heater 16 is turned off and the cooling apparatus 17 starts its operation to cool dehumidifying material by allowing cooled dry air to flow therethrough. This is because of the necessity for cooling down dehumidifying material to a lower temperature close to room temperature due to the fact that dehumidification fails to be achieved satisfactorily as long as dehumidifying material is kept hot. After dehumidifying material is cooled down, the three-way valve 18 is shifted so that dry air which has passed through the dehumidifying column 15 is introduced into the heating column 13. It should of course be understood that if air cooled in the cooling apparatus 24 is to be utilized, it is caused to flow into the dehumidifying column 15 via the filter 25. At this moment the dehumidifying column 14 initiates the same regenerating cycle as mentioned above with respect to the dehumidifying column 15.

To cool dehumidifying material in the dehumidifying columns 14 and 15 it usually takes a time longer than two hours, although this varies in dependence on the amount of dehumidifying material to be cooled. Further, in the illustrated case, another drawback is that a large amount of electric power is consumed because the heater 16 requires 6 KW, the cooling apparatus 3 KW and the heater 19 in the heating column 13 3 KW. As described above, in a case where waste air to be discharged through the discharging port 23 is reused, there is a necessity for installing the cooling apparatus 23 to cool hot waste air in order to assure that dehumidifying material functions properly. Thus, a large amount of thermal energy is consumed in vain. Moreover, mechanical driving energy is required for operating the cooling apparatus 23.

SUMMARY OF THE INVENTION

Thus, the present invention has been made with the foregoing background in mind and its object resides in providing an improved hopper drier which is entirely free from the above-mentioned drawbacks, is simple in structure and assures remarkable energy saving.

To accomplish the above object there is proposed according to the present invention a hopper drier of the type essentially comprising a hopper drier housing adapted to hold therein granular material of synthetic resin to be supplied to a molding machine, the hopper drier housing being formed with a dry hot air introducing port at the lower end part and two discharging ports at the upper end part thereof, one of the discharging ports being in communication with the suction side of a blower, first and second dehumidifying means having dehumidifying material filled therein to prepare dehumidified air to be supplied to the hopper drier housing, each of the dehumidifying means being formed with a first introducing and discharging port at the lower end part and a second introducing and discharging port at the upper end part thereof, the first introducing and discharging port being in communication with an air delivery pipe via a first switching valve through which compressed air is delivered and the second introducing and discharging port being in communication with an air delivery pipe via a second switching valve, a heating column of which one end is in communication with the delivery side of the blower and of which other end is in communication with the introducing port at the lower end part of the hopper drier housing, the heating column including a heating pipe spirally wound round the heating column for preheating dehumidified air of which one end is connected to the air delivery pipe, a nozzle connected to the other end of the heating pipe to supply into the heating column dehumidified air which has been preheated while flowing through the heating pipe and a heater disposed in the heating column to heat up to a predetermined temperature the mixture of air discharged through the nozzle and air blown from the blower, and the first switching valve being operated such that when compressed air is supplied into the one dehumidifying means, waste air is discharged from the other dehumidifying means to the outside environment and the second switching valve being operated such that dehumidified air is delivered from the one dehumidifying means to the heating pipe and a part of dehumidified air is introduced into the other dehumidifying means.

In a preferred embodiment of the invention the hopper drier housing is provided with an one-way valve in one of the discharging ports at the upper end part thereof so that only a volume of air equal to that of air supplied through the nozzle is discharged to the outside environment via the one-way valve. Thus, air pressure in the hopper drier housing is maintained constant at all times. Further, the second switching valve includes a one-way valve adapted to flow therethrough only air coming from the second introducing and discharging port to the delivery pipe and inhibit air from flowing from the delivery pipe and an orifice disposed in parallel with the one-way valve to flow therethrough a part of air coming from the delivery pipe to the second introducing and discharging pipe.

Since the hopper drier of the invention is constructed in the above-described manner, compressed air introduced into the one dehumidifying means via the first switching valve is dehumidified therein, dehumidified air is preheated while it flows through the heating pipe and thereafter preheated air is introduced into the heating column through the nozzle. The heating column is supplied with hot air at the upper end part thereof which is delivered from the hopper drier housing by operating the blower so that it is mixed with air which is delivered through the nozzle and thereby the mixture has a reduced absolute temperature. However, the mixture is heated up to a predetermined temperature again by means of the heater in the heating column and it is then introduced into the hopper drier housing. The one-way valve disposed at the upper end part of the hopper drier housing serves to allow a volume of air equal to that of air supplied through the nozzle to be discharged therethrough to the outside environment so that highly dried hot air is supplied into the heating column at all times with the aid of the blower. Since dry air supplied through the nozzle is preheated by means of the heating pipe, the heater incorporated in the heating column is required to consume a highly reduced amount of electric power. Further, a part of the dry air dehumidified in the one dehumidifying means is introduced into the other dehumidifying means via the orifice so as to dry dehumidifying material in the other dehumidifying means. When it is found that the one dehumidifying means has reduced dehumidifying capability, the first switching valve is shifted so that the other dehumidifying means is put in use.

Other objects, features and advantages of the invention will become more clearly apparent from a reading of the following description which has been prepared in conjunction with the drawings.

BRIEF DESCRIPTION OF THE DRAWINGS

The accompanying drawings will be briefly described below.

DESCRIPTION OF THE PREFERRED EMBODIMENT

Now the present invention will be described in greater detail hereunder with reference to FIG. 2 which schematically illustrates a hopper drier in accordance with a preferred embodiment of the invention.

Figure 1:
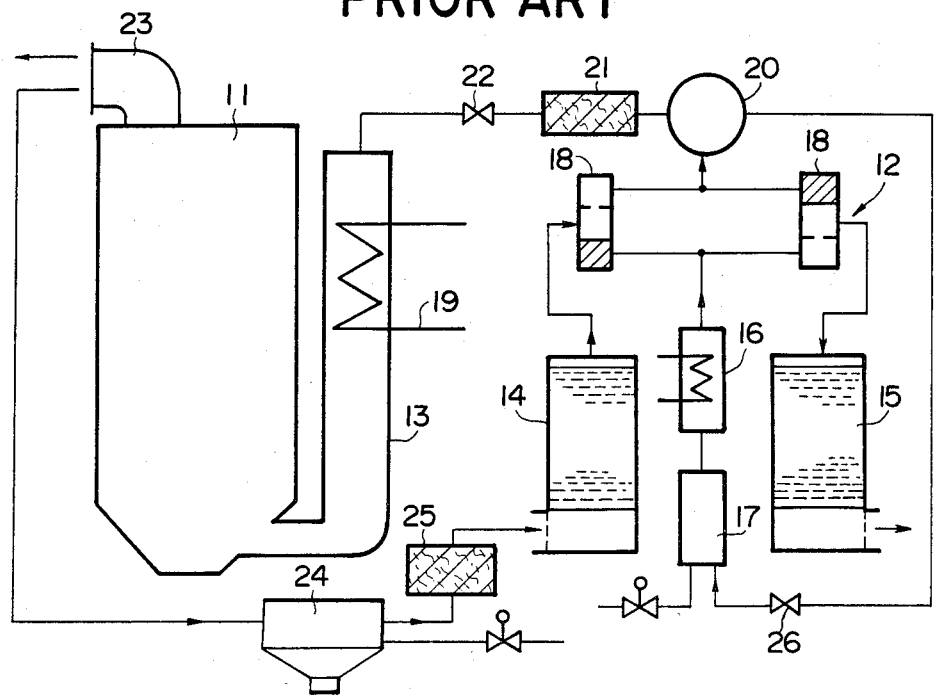
FIG. 1 is a system flow chart schematically illustrating how a typical conventional hopper drier is constructed.
Figure 2:
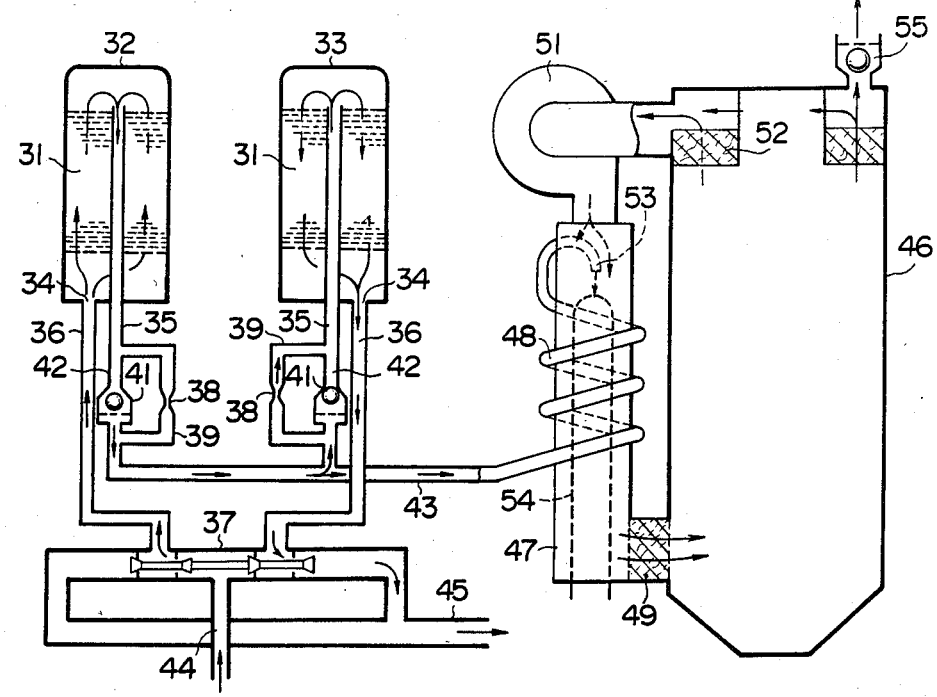
FIG. 2 is a system flow chart schematically illustrating how a hopper drier in accordance with an embodiment of the invention is constructed.

Referring to FIG. 2, two dehumidifying columns 32 and 33 are shown in which dehumidifying material is filled. As is apparent from the drawing, both the dehumidifying columns 32 and 33 are the same in structure and therefore description will be made below only with respect to the dehumidifying column 32. The dehumidifying column 32 has an introducing and discharging port 34 (hereinafter referred to as port) formed at the bottom thereof and an introducing and discharging pipe 35 (hereinafter referred to as pipe) is vertically inserted through the dehumidifying column 32 in such a manner that its upper end is located at the upper part of the latter. The pipe 35 is projected downwardly of the dehumidifying column 32 until it is in communication with a bypass pipe 39 with an orifice 38 disposed midway thereof and moreover it is in communication with a main pipe 42 with a one-way valve 41 disposed midway thereof. The one-way valve 41 is designed in the conventional manner such that fluid discharging from the pipe 35 is allowed to flow but fluid discharging from the main pipe 42 is inhibited. The lower end part of the bypass pipe 39 is joined to the lower end part of the main pipe 42. The main pipe 42 for each of the dehumidifying columns 32 and 33 is in communication with a delivery pipe 43 at the bottom thereof. There is provided a three-way valve 37 of which a second port is in communication with a connection pipe 33 for the dehumidifying column 32 and of which a third port is in communication with a connection pipe 44. The latter extends to a compressor which is not shown in the drawing so that compressed air which has been dehumidified and cooled is introduced into either of the dehumidifying columns 32 and 33 by selectively shifting the three-way valve 37. As will be readily seen from the drawing, compressed air delivered through the connection pipe 44 is introduced into the dehumidifying column 32 via the three-way valve 37 and the connection pipe 36 and after completion of dehumidification compressed air is delivered to the delivering pipe 43 via the pipe 35 and the one-way valve 41. A part of the compressed air in the delivery pipe 43 is introduced into the dehumidifying column 33 via the orifice 38 while the one-way valve 41 in the main pipe 42 is kept closed under the influence of the pressure of compressed air active in the opposite direction. Thus, no compressed air is introduced into the dehumidifying column 33 through the main pipe 42. After passing through the dehumidifying column 33 compressed air is delivered to the three-way valve 37 via the connection pipe 36 and it is then discharged into the outside environment via a discharging pipe 45. Namely, the working state as illustrated in FIG. 2 represents the dehumidifying column 32 being kept in the normal working cycle while the dehumidifying column 33 is kept in the regenerating cycle.

The delivery pipe 43 extends further to the right as seen in the drawing until it is jointed to a heating pipe 48 which is spirally wound round a heating column 47 disposed by the side of a hopper dryer housing 46. The lower end part of the heating column 47 is in communication with the lower end part of the hopper dryer housing 46 via a filter 49 located therebetween. On the other hand, the upper end part of the heating column 47 is in communication with the upper end part of the hopper dryer housing 46 via a blower 51 located above the heating column 47 and a filter 52 housed in the upper end part of the hopper dryer housing. The heating pipe 48 extends further upwardly while spirally winding round the heating column 47 until it reaches a nozzle 53 which is opened toward the interior of the heating column 47. A heater 54 is housed in the heating column 47 so as to heat dry compressed air which has been blown into the latter through the nozzle 53 whereby dried hot air is delivered to the hopper drier housing 46. The hopper drier housing 46 is provided with a one-way valve 55 at the upper end thereof which is opened to the outside environment so that a part of the hot air is discharged to the outside through the one-way valve 55.

Next, operation of the hopper drier of the present invention as constructed in the above-described manner will be described below.

Dehumidified compressed air supplied from a compressor via the connection pipe 44 is introduced into the dehumidifying column 32 via the three-way valve 37 so that it is dehumidified further therein with the aid of dehumidifying material 31. Compressed air which has been dried is delivered to the delivery pipe 43 via the pipe 35 and the one-way valve 41. After passing through the delivery pipe 43 it enters the heating pipe 48 and it is then introduced into the heating column 47 through the nozzle 53. The heating column 47 is heated up to an elevated temperature by a combination of hot air flowing therethrough and heater 54 whereby air in the heating pipe 48 is heated by heat radiated from the heating column 47. Thus, hot compressed air is blown into the heating column 47. After it is dried and heated up further to an elevated temperature in the heating column 47, it is introduced into the lower part of the hopper dryer housing 46 via the filter 49 so as to dry pellets held in the hopper drier housing 46. As air flows up through the hopper drier housing 46 while drying pellets, it becomes humidified. Thus, a volume of air equal to the volume of air blown through the nozzle 53 is discharged to the outside via the filter 52 and the one-way valve 55, whereas a residual volume of air is delivered to the heating column 47 again with the aid of the blower 51 and it is mixed with dried hot air blown through the nozzle 53 so that the mixture is reheated by the heater 54. Reheated dry hot air is introduced into the hopper drier housing 46 again.

As it passes through the hopper drier housing, it is considerably cooled down to a temperature which measures about 80% of the initial temperature of hot air supplied from the heating column 47, wherein the aforesaid temperature varies in dependence on the volume of pellets stored in the hopper drier housing 46. Provided that hot air supplied from the heating column 47 has a temperature of 100° C., return air entering the blower 51 has a temperature of about 80° C. Due to this fact there is required only a sufficient amount of thermal energy to heat up air by an extent of about 20° C., once adjustment has been made in the beginning time of operation, so as to supply to the hopper drier housing 46 hot air having a temperature of 100° C.

On the other hand, the one-way valve 41 for the other dehumidifying column 33 is kept closed under the influence of the pressure of compressed air coming from the one dehumidifying column 32 so that compressed air is inhibited from flowing into the dehumidifying column 33 via the one-way valve. However, a part of the dry compressed air is allowed to enter the dehumidifying column 33 at its upper end and it is utilized to carry out a regenerating cycle for drying the dehumidifying material 31. Thus supplied dry air is caused to flow downwardly from the upper end part of the dehumidifying column 33 and thereafter it is discharged into the outside environment via the port 34, the connection pipe 36, the three-way valve 37 and the discharging pipe 45. Accordingly, the hopper drier is operated such that dry air is supplied to the heating pipe 48 from the one dehumidifying column 32 while a part of the dry air coming from the latter is introduced into the other dehumidifying column 33 so as to dry dehumidifying material 31 at a lower temperature. When it is found that the dehumidifying column 32 has reduced dehumidifying capability, the three-way valve 37 is shifted immediately in such a manner that the one dehumidifying column 32 undertakes the regenerating cycle and the other dehumidifying column 33 which has completed the dehumidifying operation undertakes the normal working cycle.

Next, explanation will be made below as to whether or not dry hot air can be produced by mixing very highly dried air with air having moisture absorbed in the hopper drier housing 46. For instance, 6,6 nylon resin of 50 Kg having a moisture of 0.3% contains a moisture of 150 grams. Incidentally, the moisture content recommended by suppliers is about 0.1%. To allow 50 Kg resin having a moisture of 0.3% to be dried to a level of 0.1% moisture for three hours it is necessary to expell moisture at a rate of 33.3 grams per hour. Now, it is assumed that the hopper drier including the hopper drier housing 46, the heating column 47 and the blower 51 has a working volume of 110 liters and 50 Kg resin in the form of pellets has a volume of about 90 liters. Further, it is assumed that air having a dew point of $-53°$ C. is supplied at a rate of 5.4 m$^3$ per hour and air in the hopper drier housing 46 has a dew point of $-20°$ C. at a time when heating is initiated. If resign is filled at a volume rate of 60%, it has a net volume of 54 liters and therefore the hopper drier has a space volume of 56 liters. Thus, air having a dew point of $-20°$ C. contains a moisture of 0.049476 grams in the aforesaid space volume of 56 liters.

Since the amount of air to be discharged is equal to the amount of air introduced into the hopper drier, air is discharged to the outside environment through the one-way valve 55 at a rate of 5.4 m$^3$ per hour. A number of experiments reveal that air has a dew point of $+5°$ C. for the initial period of 2.5 hours when it is discharged through the piled layer of 6,6 nylon. Thus, moisture contained in air, that is, moisture to be expelled is 36.7092 grams. On the other hand, very highly dried air having a dew point of $-53°$ C. has a moisture of 109.69 grams when it is introduced at a rate of 5.4 m$^3$/Hr. Since moisture expelled every hour is 36.56556 grams which is obtainable from an arithmetic calculation of $36.7092-0.14364=36.56556$, it results that moisture expelled for three hours amounts to 109.69 grams. This means that a hopper drier of the present invention mounted for a certain molding machine adapted to consume pellets at a rate of 15 Kg per hour assures that pellets are conditioned to a dried state suitable for a molding operation within three hours and moreover the dried state is maintained while pellets to be dried are charged into the hopper drier as the dried pellets are consumed.

Further, it is found that the hopper drier of the invention consumes a total electric power less that 2.9 Kw/Hr because the heater for preparing dry air consumes less than 1 Kw/Hr of electric power, the compressor for supplying dehumidified air less than 1.5 Kw/Hr and the blower less than 0.4 Kw/Hr. This means that remarkable energy saving can be achieved by employing the hopper drier of the invention. Another advantageous feature of the invention is that the cooling capacity required for a room having the hopper drier mounted therein can be substantially reduced because the amount of heat radiated from the heating column is inhibited to less than about 20% of the total inputted heat owing to the arrangement of the heating coil spirally wound round the heating column.

While the present invention has been described above in relation only to a preferred embodiment, it should be understood that it should not be limited only to this and various changes or modifications may be made in a suitable manner without any departure from the spirit and scope of the invention as defined in the appended claims.

What is claimed is:

1. A hopper drier comprising;
   a hopper drier housing adapted to hold therein granular material of synthetic resin to be supplied to a molding machine, said hopper drier housing being formed with a dry hot air introducing port at the lower end part and two discharging ports at the upper end part thereof, one of said discharging ports being in communication with the suction side of a blower,
   first and second dehumidifying means having dehumidifying material filled therein to prepare dehumidified air to be supplied to the hopper drier housing, each of said dehumidifying means being formed with a first introducing and discharging port at the lower end part and a second introducing and discharging port at the upper end part thereof, said first introducing and discharging port being in communication with an air delivery pipe via a first switching valve through which compressed air is delivered and said second introducing and discharging port being in communication with an air discharging pipe via a second switching valve,
   a heating column of which one end is in communication with the delivery side of the blower and of which the other end is in communication with the introducing port at the lower end part of the hopper of the drier housing, said heating column including a heating pipe spirally wound round the heating column for preheating dehumidified air of which one end is connected to the air delivery pipe, a nozzle connected to the other end of said heating pipe to supply into the heating column dehumidified air which has been preheated while flowing through the heating pipe and a heater disposed in the heating column to heat up to a predetermined temperature the mixture of air discharged through said nozzle and air blown from the blower, and
   said first switching valve being operated such that when compressed air is supplied into the one dehumidifying means, waste air is discharged from the other dehumidifying means to the outside environment and said second switching valve being operated such that dehumidified air is delivered from the one dehumidifying means to the heating pipe and a part of dehumidified air coming from the one dehumidifying means is introduced into the other dehumidifying means.

2. A hopper drier as claimed in claim 1, wherein the hopper drier housing is provided with a one-way valve in one of the discharging ports at the upper end part thereof, said one-way valve serving to discharge to the outside environment a volume of air equal to that of the air supplied through the nozzle.

3. A hopper drier as claimed in claim 1, wherein the second switching valve includes a one-way valve adapted to flow therethrough only air coming from the second introducing and discharging port to the delivery pipe and to inhibit air from flowing from the delivery pipe and an orifice disposed in parallel with said one-way valve to flow therethrough a part of the air coming from the delivery pipe to the second introducing and discharging port.

4. A hopper drier as claimed in claim 1, wherein the first introducing and discharging port is disposed at the lower part of each of the dehumidifying means and the second introducing and discharging port is disposed at the upper part of the same.

5. A hopper drier comprising a hopper drier housing adapted to hold therein granular material of synthetic resin to be supplied to a molding machine, said hopper drier housing being formed with a dry hot air introducing port and two discharging ports, a blower having a suction side and a delivery side, one of said discharging ports being in communication with said suction side of said blower, first and second dehumidifying means having dehumidifying material filled therein to prepare dehumidifed air to be supplied to said hopper drier housing, each of said dehumidifying means being formed with a first and a second introducing and discharging port, a connection pipe means delivering compressed air, a discharging pipe, first switching valve means connected between said connection pipe means and said discharge pipe, said first switching valve means having a first position in which compressed air is delivered via said connection pipe means to said first dehumidifying means while air is discharged from said second dehumidifying means to said discharge pipe, said first switching valve means having a second position in which compressed air is delivered via said connection pipe means to said second dehumidifying means while air is discharged from said first dehumidifying means to said discharge pipe, a heating column of which one end is in communication with said delivery side of said blower and the other end is in communication with said introducing port of said hopper drier housing, said heating column including a heating pipe for preheating dehumidified air of which one end is connected to a delivery pipe which is operable to receive dehumidified air from said first and second dehumidifying means, second switching valve means between said delivery pipe and said first and second dehumidifying means, said second switching valve means having a first position operable to introduce a portion of the dehumidified air in said delivery pipe to said second dehumidifying means when said first switching valve means is in said first position, said second switching valve means having a second position operable to introduce a portion of the dehumidified air in said delivery pipe to said first dehumidifying means when said first switching valve means is in said second position, a nozzle connected to the other end of said heating pipe to supply into the heating column dehumidified air which has been preheated while flowing through the heating pipe, and a heater disposed in the heating column to heat the mixture of the air discharged through said nozzle and the air blown from said blower.

6. A hopper drier as claimed in claim 1 further comprising a one-way valve in the other of said discharging ports of said hopper drier housing, said one-way valve serving to discharge to the outside environment a volume of air equal to that of the air supplied through said nozzle.

7. A hopper drier as claimed in claim 6, wherein said second switching valve means comprises a first one-way valve between one of said introducing and discharging ports on said first dehumidifying means and said delivery pipe and a second one-way valve between one of said introducing and discharge ports on said second dehumidifying means and said delivery pipe, said first and second one-way valves permitting one-way flow therethrough in a direction from the respective introducing and discharging ports to said delivery pipe.

8. A hopper drier as claimed in claim 7, wherein said second switching valve means further comprises first orifice means disposed in parallel with said first one-way valve and second orifice means disposed in parallel with said second one-way valve, said first and second orifice means by-passing said first and second one-way valves respectively to introduce said portion of said dehumidifying air in said delivery pipe to said first and second dehumidifying means respectively.

9. A hopper drier as claimed in claim 8, wherein compressed air is delivered via said connection pipe means to said first port of each of said first and second dehumidifying means and air is discharged from said second port of said first and second dehumidifying means to said delivery pipe via said second switching valve means, said first port being disposed at a lower part of said first and second dehumidifying means, said second port being disposed at an upper part of said first and second dehumidifying means.

* * * * *